United States Patent [19]

Stöckl

[11] 4,153,351
[45] May 8, 1979

[54] MOTION-PICTURE CAMERA

[75] Inventor: Friedrich Stöckl, Vienna, Austria

[73] Assignees: Karl Vockenhuber; Hauser Raimund, both of Vienna, Austria

[21] Appl. No.: 901,711

[22] Filed: May 1, 1978

[30] Foreign Application Priority Data

May 2, 1977 [AT] Austria ............................ 3074/77

[51] Int. Cl.² .......................................... G03B 21/36
[52] U.S. Cl. .................................. 352/91 C; 352/72
[58] Field of Search ............... 352/91 R, 91 S, 91 C, 352/78 R, 72

[56] References Cited

U.S. PATENT DOCUMENTS

| | | | |
|---|---|---|---|
| 3,582,198 | 6/1971 | Reinsch | 352/91 S |
| 3,680,813 | 8/1972 | Koeber | 352/91 S |
| 3,689,137 | 9/1972 | Yozo | 352/91 S |
| 3,712,720 | 1/1973 | Winkler et al. | 352/91 C |

FOREIGN PATENT DOCUMENTS 1136897 1/1957 France .................................. 352/91 C Primary Examiner—Monroe H. Hayes
Attorney, Agent, or Firm—Montague & Ross

[57] ABSTRACT

For trick cinematography, a motion-picture camera is equipped with a pushbutton which upon actuation blocks or retards the windup of a film in a cassette while the film transport past an image gate continues. The advancing film, with or without exposure according to the desired effect (cross-fading or reverse filming), is deflected from an exposure gap in the cassette, either at the image gate or at a sound-recording head, into a loop received in an adjacent storage chamber from which it is subsequently withdrawn by reverse transportation under the control of a counter which registers the number of frames in the loop. The deflection of the film during the loop-forming phase may be effected by a baffle or by a perforation-engaging detent.

8 Claims, 7 Drawing Figures

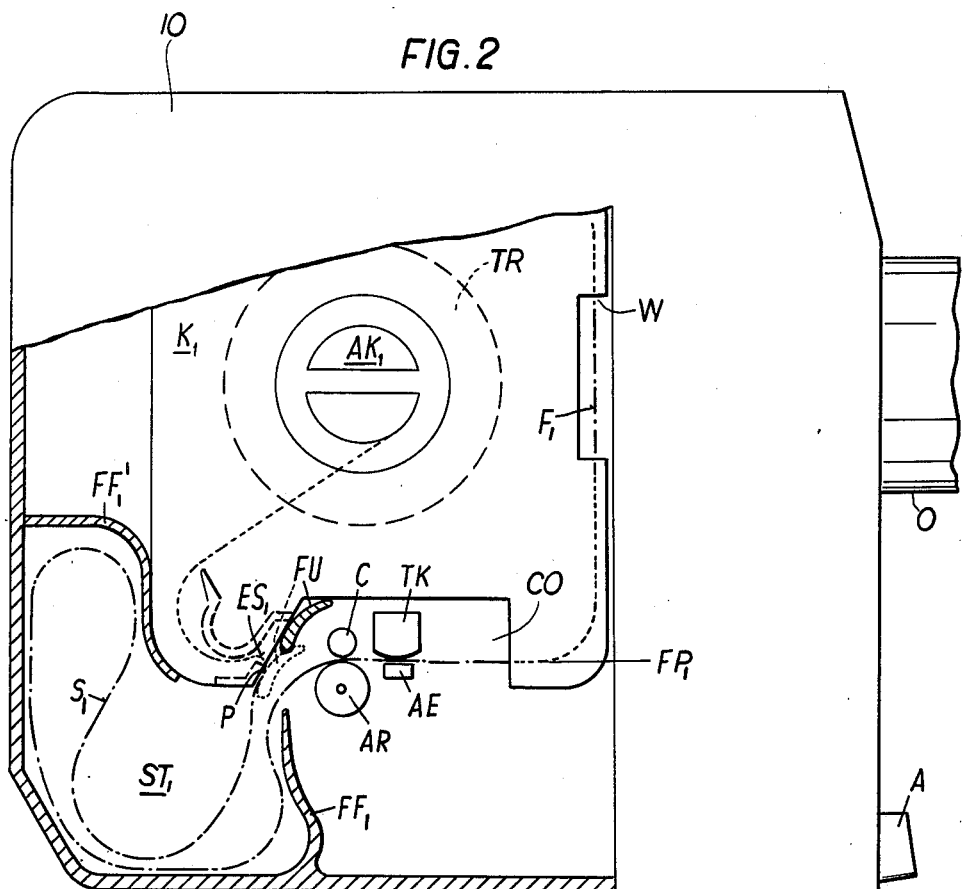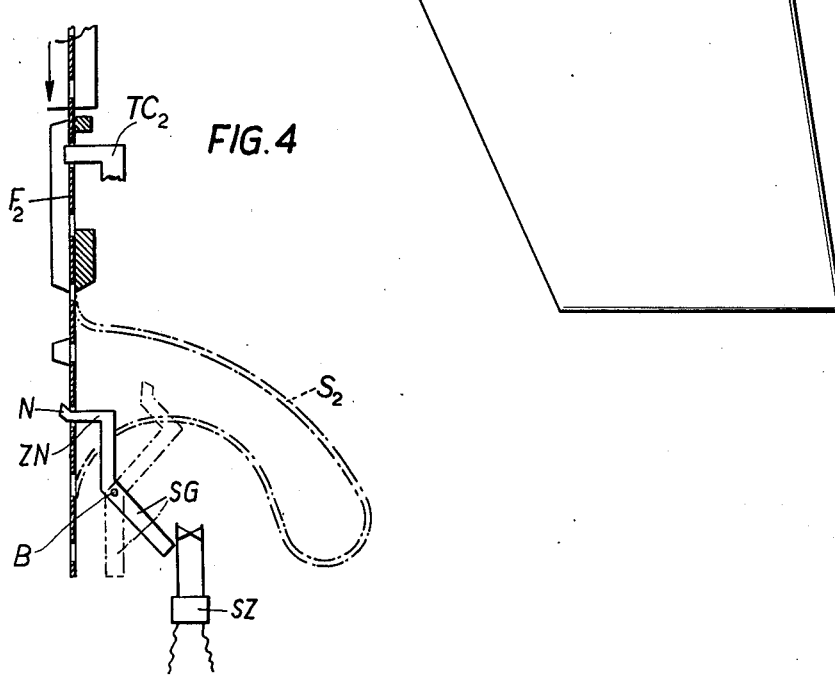

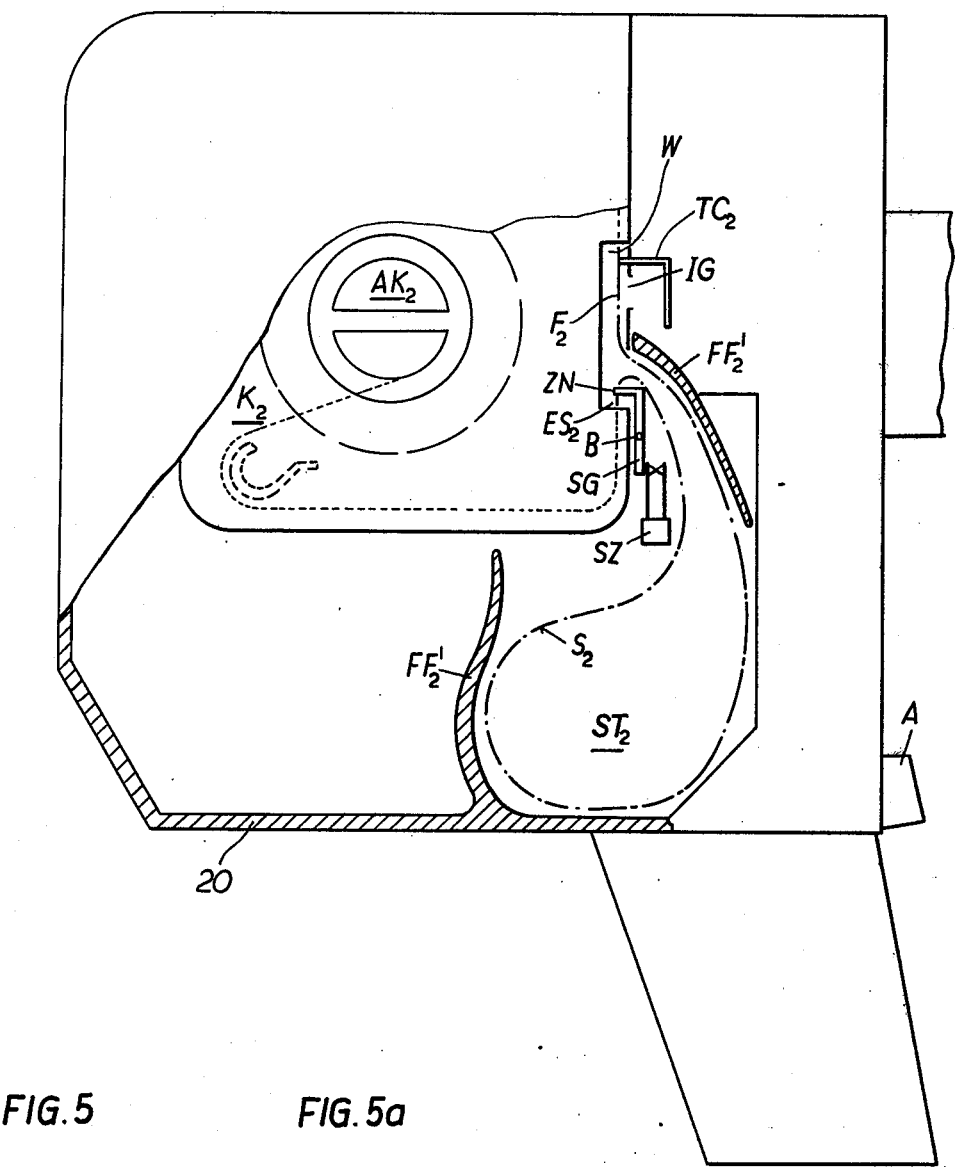
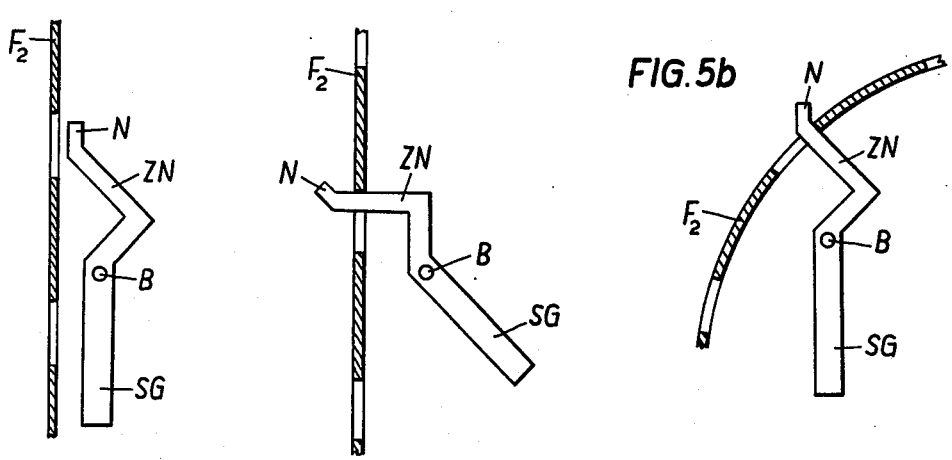

MOTION-PICTURE CAMERA

FIELD OF THE INVENTION

My present invention relates to a cassette-receiving motion-picture camera, with or without sound-recording facilities, provided with reversible film-transport means which can be used for trick cinematography such as cross-fading or reverse filming.

BACKGROUND OF THE INVENTION

The term "cross-fading" is used in the art to describe the superposition of two scenes respectively fading in and out. Thus, with the use of a suitable dissolving shutter as described for example in U.S. Pat. No. 3,635,549, the fadeout of a preceding scene is followed by reverse transportation of the film with the shutter closed whereupon part of the film is re-exposed with a fade-in effect leading into the subsequent scene. As further described in that prior patent, a takeup reel inside the film cassette is driven at less than normal speed in the first phase of such a trick shot—i.e. during the fadeout — whereby a reserve length of film accumulates in the cassette for subsequent withdrawal in a second phase, i.e. during the reverse run.

The accumulation of a reserve length of film by the stepping or slowing of a windup operation is not necessary if the camera is equipped with means for selectively releasing the usual rewind stop of a film cassette. Such releasable rewind stops are often provided in sound-film cassettes but are usually lacking in cassettes of the silent-film type. A camera designed to handle both types of cassettes is therefore sometimes provided with a sensor designed to detect the presence of a sound-film cassette as distinct from a silent-film cassette which is generally smaller than the former, the sensor being used to deactivate the stop-release mechanism if there is no sound-film cassette in the camera; see commonly owned U.S. Pat. No. 4,065,209.

Only a limited length of excess film can be accumulated in a cassette, in the vicinity of its takeup reel, for subsequent withdrawal if the reel does not have a releasable rewind stop. Such accumulation may be sufficient for cross-fading purposes but would be unsuitable for other types of trick cinematography in which it is desired to run extended scenes or perhaps the entire film in reverse to create an effect of backward motion upon reproduction. The same applies to situations in which a major part of a film is to be exposed twice, as for background scenery and foreground action, without cross-fading.

OBJECT OF THE INVENTION

The object of my present invention is to provide means in a motion-picture camera for facilitating such trick shots regardless of whether or not the film cassettes used therein have rewind stops of the releasable type.

SUMMARY OF THE INVENTION

I realize this object, in accordance with the present invention, by the provision of control means in a camera housing selectively operable during a first phase of a trick shot for arresting or at least retarding the re-entry of the film into its cassette from an exposure gap, with resulting accumulation of excess film downstream of the transport mechanism in the cassette compartment of the camera housing, and guide means in that housing for directing at least part of this excess film into a predetermined space adjacent the exposure gap but separated from the transport mechanism to enable a subsequent withdrawal of the excess film during a second phase of the trick shot upon the operation of manual or automatic switchover means reversing the direction of the film movement.

The aforementioned exposure gap, making the film accessible for the recordal of information thereon, could be either a window confronting the image gate of the camera upon insertion of the cassette or, in the case of a sound film, a cutout downstream of that window in which the film coacts with a sound-recording head and is engaged by a continuously rotating capstan.

Pursuant to a more particular feature of my invention, the control means may include a retaining element which is displaceable into the path of the film re-entering the cassette from the exposure gap here considered. The retaining element, acting either as a brake or as a stop, may be movable within the cutout of a sound-film cassette to hold the film against an edge of that cutout downstream of the capstan. Alternatively, and particularly with silent-film cassettes, that element may have a tooth engageable with a perforation of the film near a re-entry edge of the exposure gap in the vicinity of the image gate.

BRIEF DESCRIPTION OF THE DRAWING

The above and other features of my invention will now be described in detail with reference to the accompanying drawing in which:

FIG. 2 is a side-elevational view, partly in section, of the camera shown in FIG. 1;

FIG. 3 is a view similar to FIG. 2 but showing a modified camera according to my invention;

FIG. 4 is an enlarged, somewhat diagrammatical view of a detail of the camera shown in FIG. 3;

FIG. 5 is a view similar to FIG. 4, drawn to a still larger scale; and

FIGS. 5a and 5b show the parts of FIG. 5 in different positions.

SPECIFIC DESCRIPTION

Figure 1:
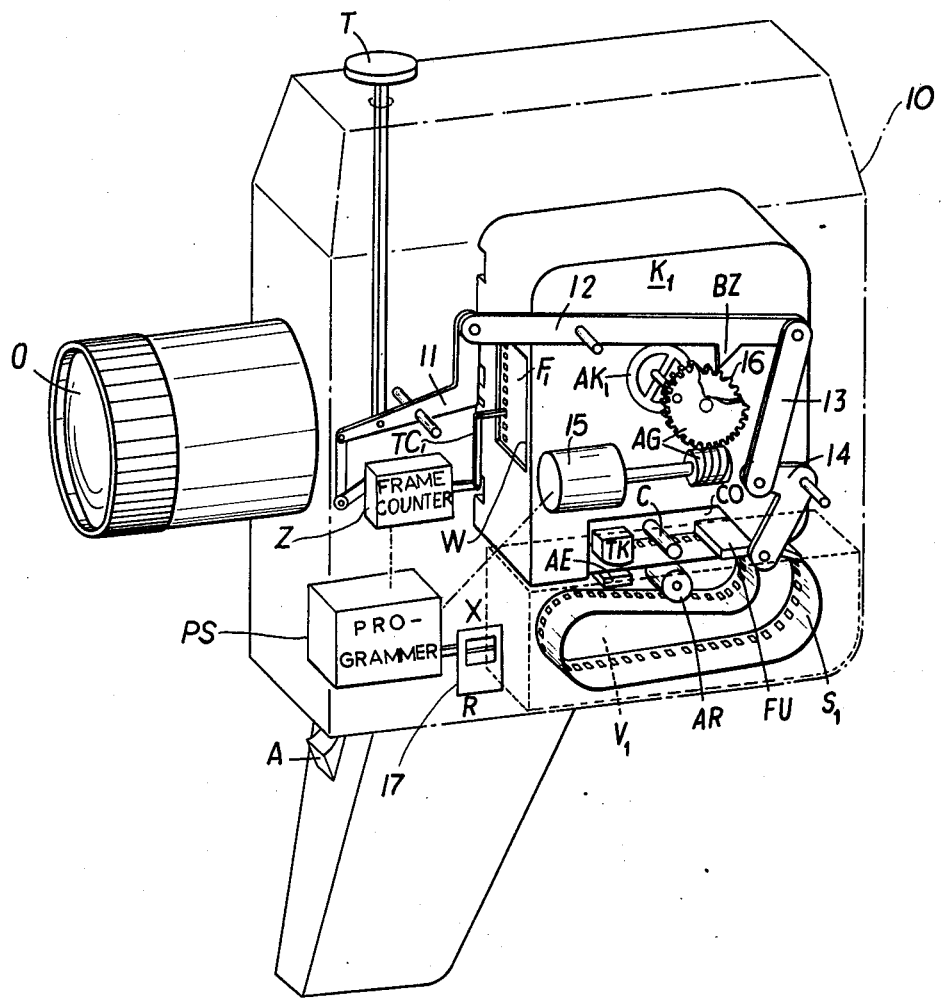
FIG. 1 is a perspective view of a motion-picture camera embodying my invention.

In FIGS. 1 and 2 I have shown a motion-picture camera 10 provided with the usual objective O and trigger A. The camera housing has been illustrated only in phantom lines in order to reveal an inserted sound-film cassette $K_1$ as well as a number of internal components of the camera. These components include a drive motor 15 which, in normal operation, rotates a takeup reel TR of the camera through a hub $AK_1$ coupled therewith by way of a nonillustrated friction clutch. A sound film $F_1$ in cassette $K_1$ is accessible at two exposure gaps, namely a window W in line with the axis of objective O and a cutout CO downstream of that window which accommodates a sound-recording head TK above a film support AE, a capstan C coacting with a pressure roller, and a baffle-shaped retaining element FU whose function will be described hereinafter. Window W confronts an image gate (shown at IG in FIG. 3) which can be periodically obstructed by a rotary shutter (not shown) synchronized with a traction claw $TC_1$. The latter forms part of a reversible transport mechanism, not further illustrated, normally actuatable by the trigger A to advance the film $F_1$ in a forward direction across the two gaps W and CO. During such normal operation, the film moves downwardly past the window W and is wound up without slack on takeup reel TR in a manner well known per se.

The transport mechanism including claw $TC_1$ is reversible under the control of a programmer PS which also controls a non-illustrated dissolving shutter in objective O for fade-in and fade-out effects. The programmer PS is settable with the aid of a manual selector 17 to carry out cross-fading (position X) or reverse-filming (position R) operations as discussed above. These operations are initiated by the depression of a preferably spring-loaded pushbutton T which is connected with retaining element FU by way of an articulated linkage including a bell-crank lever 11, a straight lever 12, a link 13 and a bell-crank lever 14. Lever 12 carries a tooth BZ which, upon depression of pushbutton T, engages the toothed wheel 16 of the takeup drive to arrest the reel TR. At the same time the element FU is shifted within cutout CO into the film plane FP along an edge $ES_1$ of that cutout through which the film $F_1$ normally re-enters the cassette $K_1$. By this shift, indicated in point-dotted lines in FIG. 2, the film is clamped between element FU and cassette $K_1$ at a point P so that the continuing advance of the film by claw $TC_1$ and capstan C causes the film to be deflected into a storage space $ST_1$ defined within the camera housing by partitions $FF_1$ and $FF_1'$. Such deflection is brought about by the curved baffle FU and by the partition $FF_1$ acting as guide means for the film which now forms a loop $S_1$ in space $ST_1$. The length of this loop, in terms of transport cycles or frames, is determined by a reversible counter Z which is set in operation by the actuation of pushbutton T.

With selector 17 in position X, programmer PS progressively dims the illumination of film $F_1$ by gradually closing the dissolving shutter during this first phase of a cross-fading operation at the end of which, e.g. when the frame count has reached a certain value, it reverses the feed direction of the transport claw $TC_1$. With illumination completely cut off, counter Z then counts backwards to zero during a second phase in which the excess film forming the loop $S_1$ is extracted from space $ST_1$ and rewound on the supply reel (not shown) of the cassette. At the end of this second phase, which may be indicated to the user by the programmer or possibly by a loop sensor, the third phase of cross-fading can be started with progressive reopening of the dissolving shutter by the programmer or manually by the user. The programmer may also de-energize the motor 15 during the first two phases.

In selector position R, the programmer closes the dissolving shutter during the loop-forming phase which lasts as long as the pushbutton T is held depressed. Thereafter, this shutter is reopened so that as many film frames can be exposed in reverse sequence as have been stored in space $ST_1$ during preceding phase, again under the control of counter Z. The programmer stores the frame count so that the reverse-exposed stretch of film can then be wound up on reel TR (with the dissolving shutter closed) before resumption of normal operation at the first previously unexposed frame.

In lieu of a complete stopping of the takeup drive by the tooth BZ, as described above, I may provide a step-down transmission which slows down the rotation of reel TR to a fraction of its normal speed, e.g. as described in the aforementioned U.S. Pat. No. 3,635,549 or in German published specification No. 2,649,333. In that case, of course, element FU will not firmly clamp the film $F_1$ in position at point P but will only exert a braking effect on the film slowly drawn into the cassette. In this connection it may be pointed out that even the mere interposition of baffle FU into the path FP of the advancing film, coupled with the stopping or slow-down of the rotation of the takeup reel, will deflect at least part of the excess film into the chamber $ST_1$ bounded by partitions $FF_1$ and $FF_1'$.

In FIG. 3 I have shown a camera 20 designed to receive only silent-film cassettes $K_2$ with hubs $AK_2$ through which their takeup reels can be driven in the aforedescribed manner. With such a cassette, having only one exposure gap in the form of a window W, the film $F_2$ is guided into a storage space $ST_2$ bounded by partitions $FF_2$, $FF_2'$ to form a loop $S_2$ whenever the takeup reel is slowed or stopped. To assist in the formation of this loop, a retaining element SG in the form of a swingable detent with a fixed fulcrum B has a tooth ZN engageable in a perforation of the film downstream of transport claw $TC_2$ and image gate IG, just ahead of a re-entry edge $ES_2$ of window W. Detent SG, operatively coupled with an actuator such as pushbutton T (FIG. 1), is shown to coact with a switch SZ which starts the operation of counter Z at the beginning of a trick shot. Partition $FF_2$, interposed between claw $TC_2$ and detent SG, has a function analogous to that of partition $FF_1$ (FIG. 2) in keeping the film loop separated from the associated transport means.

As more clearly shown in FIGS. 4 and 5, the tooth ZN of detent SG may terminate in a lug 10 projecting against the normal transport direction, i.e. upwardly as viewed in these Figures. The mechanical or electrical coupling between the actuator and the detent SG is preferably so designed that this detent is swung only briefly from its disengaged position (FIG. 5) into its off-normal position (FIG. 5a) to stop the advancing film at the beginning of the first phase of a trick shot. Immediately thereafter, the detent is swung back to its normal position (FIG. 5b) whereby the film $F_2$ is deflected in the direction away from the cassette, analogously to the deflection of film $F_1$ by baffle FU in FIG. 2. In coaction with partition $FF_2$, therefore, detent SG guides the film into the chamber $ST_2$ to form the loop $S_2$ as illustrated in phantom lines in FIG. 4. The operation of counter Z (FIG. 1), once started by the switch SZ, continues under the control of programmer PS throughout the first phase and reverses in the second phase as described above.

When the rewinding operation is completed at the end of the second phase, the stretching of the film disengages it from the tooth ZN to restore the normal position of FIG. 5. The final phase of the trick shot can then begin, with the dissolving shutter closed in the case of reverse filming or progressively opening in the case of cross-fading. In a further position of selector 17 (FIG. 1), or by manually overriding the programmer PS, the described system may also be used for a second exposure of all or part of the same film.

I claim:
1. A motion-picture camera having a housing which forms a compartment adapted to receive a cassette with at least one exposure gap giving access to a film for the recordal of information thereon, reversible transport means engageable at said exposure gaps with the film of a cassette inserted in said compartment for intermittently advancing said film, switchover means operatively coupled with said transport means for optionally changing the advance of said film from a normal for- ward direction to a rearward direction, and drive means engageable with a windup reel in said cassette, the combination therewith of control means in said housing selectively operable during a first phase of a trick shot for at least retarding the re-entry of said film into said cassette from said exposure gap, with resulting accumulation of excess film downstream of said transport means in said compartment, and guide means in said housing for directing at least part of said excess film into a predetermined storage space adjacent said exposure gap but separated from said transport means to enable a subsequent withdrawal thereof during a second phase of a trick shot upon operation of said switchover means.

2. The combination defined in claim 1 wherein said control means comprises a retaining element displaceably into the path of the film re-entering the cassette from said exposure gap.

3. The combination defined in claim 1 or 2 wherein said switchover means comprises a programmer controlled by a frame counter responsive to said transport means for operating said switchover means during said second phase to withdraw as much excess film from said storage space as has been accumulated therein during said first phase, said control means being operatively coupled with said frame counter for activating same in said first phase.

4. The combination defined in claim 2 wherein said transport means includes a capstan engageable with a film of an inserted sound-film cassette downstream of an image gate, the inserted cassette having a first exposure gap confronting said image gate and a second exposure gap formed by a cutout bracketing said capstan, said retaining element being movable in said cutout for clamping said film against an edge of said cutout downstream of said capstan.

5. The combination defined in claim 2 or 4 wherein said retaining element is shaped to deflect the film away from said cassetter upon displacement into said path.

6. The combination defined in claim 2 wherein said transport means includes a reciprocable claw engageable with perforations in said film at an image gate confronting said exposure gap of the inserted cassette, said retaining element having a tooth engageable in any of said perforations near a re-entry edge of said exposure gap.

7. The combination defined in claim 6 wherein said guide means includes a partition interposed between said claw and said retaining element.

8. The combination defined in claim 6 or 7 wherein said retaining element is swingable in a direction away from the cassette upon engagement of the film by said tooth to deflect the film toward said storage space.

* * * * *